(12) United States Patent
Hirose et al.

(10) Patent No.: US 7,900,578 B2
(45) Date of Patent: Mar. 8, 2011

(54) CARRYING SYSTEM AND PROCESSING EQUIPMENT

(75) Inventors: Akio Hirose, Kobe (JP); Katsuhiko Goto, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 723 days.

(21) Appl. No.: 11/783,562

(22) Filed: Apr. 10, 2007

(65) Prior Publication Data

US 2007/0243075 A1    Oct. 18, 2007

(30) Foreign Application Priority Data

Apr. 17, 2006  (JP) ................................ 2006-113920

(51) Int. Cl.
*B05C 13/00* (2006.01)

(52) U.S. Cl. ......... 118/500; 118/319; 118/320; 414/222; 414/744

(58) Field of Classification Search .................. 414/222, 414/744; 118/319, 320
See application file for complete search history.

(56) References Cited

U.S. PATENT DOCUMENTS

| 4,644,897 | A | | 2/1987 | Fender |
| 4,764,077 | A | * | 8/1988 | Susnjara .................. 414/222.03 |
| 5,765,444 | A | * | 6/1998 | Bacchi et al. .............. 74/490.03 |
| 6,491,491 | B1 | * | 12/2002 | Tsuneda et al. ............ 414/744.5 |

FOREIGN PATENT DOCUMENTS

| DE | 20 2004 017 881 U1 | 4/2006 |
| JP | A-02-083056 | 3/1990 |
| JP | A-04-200760 | 7/1992 |
| JP | A-08-118267 | 5/1996 |
| JP | A-2000-168950 | 6/2000 |
| WO | WO 87/06160 | 10/1987 |
| WO | WO 00/71292 A1 | 11/2000 |

* cited by examiner

*Primary Examiner* — Parviz Hassanzadeh
*Assistant Examiner* — Albert Hilton
(74) *Attorney, Agent, or Firm* — Oliff & Berridge, PLC

(57) ABSTRACT

A carrying system includes first and second carrying machines each of which includes a holding unit, a base and a linkage having pivotally joined first and second links. The holding unit can be moved, by turning the second link relative to the first link which is turned relative to the base, along a substantially arc carrying route extending round the pedestal between a loading position and a processing position. The arc carrying route is closer to the pedestal with respect to an imaginary circle having its center on the pedestal and a radius corresponding to the distance between the pedestal and either of the loading position and the processing position.

11 Claims, 12 Drawing Sheets

-- PRIOR ART --

-- PRIOR ART --

-- PRIOR ART --

CARRYING SYSTEM AND PROCESSING EQUIPMENT

CROSS REFERENCE TO RELATED APPLICATIONS

This application is based upon the prior Japanese Patent Application No. 2006-113920 filed on Apr. 17, 2006, the entire contents of which are incorporated herein by reference.

BACKGROUND OF THE INVENTION

1. Field of the Invention

The present invention relates to a carrying system for carrying a workpiece to a processing zone, and to a processing equipment. More particularly, the present invention relates to a carrying system for carrying a workpiece to be painted between a loading zone and a painting zone.

2. Description of the Related Art

FIG. 12 is a side elevation of a painting equipment 1 in a first example of the related art and FIG. 13 is a schematic plan view of the painting equipment 1 in the first example of the related art. The painting equipment 1 includes a painting machine 3 and a carrying machine 4. The carrying machine 4 carries a workpiece 2 along a circular route 9 between a loading zone 7 where the workpiece 2 is loaded on and unloaded from the carrying machine 4 and a painting zone 6 where the workpiece 2 is painted. The painting equipment 1 paints the workpiece 2 by spraying paint on the workpiece 2 placed in the painting zone 6 by the painting machine 3. In the painting equipment 1 in the first example of the related art, the painting machine 3 is disposed at the center of the circular route 9. The carrying machine 4 has holding units 5a and 5b disposed on the diametrically opposite sides, respectively, of the painting machine 3. The holding unit 5b is in the loading zone 7 when the holding unit 5a is placed in the painting zone 6. A workpiece 2 held by the holding unit 5a placed in the painting zone 6 is painted. A workpiece 2 held by the holding unit 5b placed in the loading zone 7 is changed for another one by an operator. The carrying machine 4 can carry workpieces 2 held by the holding units 5a and 5b between the painting zone 6 and the loading zone 7 by turning the holding unit 5a and 5b along the circular route 9.

FIG. 14 is a plan view of a painting equipment 11 in a second example of the related art. The painting equipment 11 in the second example of the related art includes a painting machine 12 and a carrying system. The carrying system has two carrying machines 13a and 13b. The carrying machines 13a and 13b have tables 5a and 5b, respectively. The tables 5a and 5b support workpieces, respectively. The tables 5a and 5b are moved along straight routes, respectively, between a painting zone 6 where a workpiece is painted and a loading zone 7 where a workpiece is loaded and unloaded. The two carrying machines 13a and 13b are disposed on the opposite sides, respectively, with respect to the painting machine 12. The carrying machines 13a and 13b include straight carrying rails, respectively.

The painting equipment 11 in the second example of the related art, as compared with the painting equipment 1 in the first example of the related art, facilitates the optional distance layout between the painting zone and the loading zone 7 and can carry a large workpiece. The carrying machines 13a and 13b can be individually operated. Therefore, a workpiece supported by the carrying machine 13b can be carried while the workpiece supported by the carrying machine 13a is being painted or being replaced with another workpiece and hence loss time is short. The painting equipment 11 in the second example of the related art is disclosed in JP-A 2000-168950.

The painting equipment 11 in the second example of the related art has the straight rails for carrying workpieces. Therefore, the distance between each loading position for the carrying machines 13a and 13b increases inevitably if the distance between each painting position for the carrying machines 13a and 13b is shortened. Consequently, space needed for installing the painting equipment 11 increases. If the two loading positions are spaced a long distance apart, one operator assigned to work for loading workpieces alternately on the carrying machines 13a and 13b needs to move a long distance for loading workpieces alternately on the carrying machines 13a and 13b and the ease of operation is low.

On the other hand, when the distance between the loading positions for the carrying machines 13a and 13b is shortened, the distance between each painting position for the carrying machines 13a and 13b increases inevitably. Consequently, space necessary for installing the painting equipment 11 increases. If the two painting positions are spaced a long distance apart and the single painting machine 12 is used for alternately painting workpieces disposed at the two painting positions, the painting machine needs to move a long distance for painting workpieces alternately on the carrying machines 13a and 13b, and hence the ease of operation is low. The same problems reside also in carrying systems other than those for painting equipments.

SUMMARY OF THE INVENTION

Accordingly, it is an object of the present invention to provide a carrying system and a processing equipment requiring small spaces for installation and capable of being easily operated.

A carrying system according to the present invention for carrying a workpiece between a processing zone where the workpiece is processed by a processing machine and a loading zone substantially opposite the processing zone with respect to a pedestal on which the processing machine is installed includes: a first carrying machine configured to carry the workpiece along a substantially arc first carrying route extending between the processing zone and the loading zone, the first carrying route having a middle part protruding away from the pedestal; and a second carrying machine configured to carry the workpiece along a substantially arc second carrying route extending between the processing zone and the loading zone, the second carrying route having a middle part protruding away from the pedestal, the second carrying route being positioned opposite the first carrying route with respect to the pedestal. Each of the first carrying machine and the second carrying machine includes a base, a first link, a second link, a first joint joining the first link to the base so as to be turnable relative to the base, a second joint joining the first link and the second link together so as to be turnable relative to each other, and a holding unit mounted on the second link, the holding unit being configured to support the workpiece and be moved along the carrying route.

The carrying machine according to the present invention can move the holding unit between the loading zone and the processing zone along the substantially arc carrying route by turning the first link relative to the base and turning the second link relative to the first link. The carrying machine moves a workpiece loaded on the holding unit in the loading zone together with the holding unit to the processing zone. The carrying machine moves a workpiece processed in the processing zone together with the holding unit to the loading zone. A new workpiece is loaded on the holding unit in the loading zone.

The carrying machine according to the present invention having a linkage can carry a workpiece along the carrying route closer to the pedestal than an imaginary circle having its center on the pedestal. Thus the carrying machine of the present invention can carry a workpiece through an area nearer to the pedestal than an area through which the carrying machine of the first related art carries a workpiece. Consequently, the increase of space necessary for installing the carrying system can be suppressed even if the loading zone and the processing zone are spaced a long distance apart.

The carrying machine having the linkage can easily carry a workpiece along a substantially arc route. A workpiece can be carried round the pedestal along a substantially arc route near the pedestal. Thus the loading positions where workpieces are loaded respectively on the first and the second carrying machine can be positioned at the shortest possible distance from each other. Similarly, the processing positions where workpieces respectively held by the first and the second carrying machines are processed can be positioned at the shortest possible distance from each other. Therefore, the difference in processing conditions between the workpieces respectively carried by the first and the second carrying machines can be reduced to the least possible extent, the carrying system can operate efficiently and the variation of processing quality can be prevented.

In the carrying system according to the present invention, preferably, the carrying machines are configured to independently carry workpieces.

According to the present invention, the first and the second carrying machines can independently carry out carrying operations. Therefore, one of the carrying machines can carry a workpiece while a workpiece supported by the other carrying machine is being processed or being changed for another one. Consequently, waiting time for which the carrying machines are obliged to stop working can be reduced and the carrying system can operate efficiently.

In the carrying system according to the present invention, preferably, the holding unit of each of the first carrying machine and the second carrying machine is configured to be moved to a processing position common to the first carrying machine and the second carrying machine in the processing zone.

According to the present invention, since the respective holding units of the first and the second carrying machines can be moved to the processing position common to the first and the second carrying machines in the processing zone, workpieces respectively carried by the first and the second carrying machines can be disposed at the same processing position. Thus the difference in processing conditions between a workpiece carried by the first carrying machine and a workpiece carried by the second carrying machines can be reduced to the least possible extent, and hence the variation of processing quality can be prevented. The processing machine can always carry out the same processing operation for workpieces respectively carried by the first and the second carrying machines. Therefore, teaching work for teaching different processing procedures of the processing machines respectively for the first and the second carrying machines is not necessary and hence teaching work can be simplified.

In the carrying system according to the present invention, preferably, the holding unit of each of the first carrying machine and the second carrying machine is configured to be moved to a loading position common to the first carrying machine and the second carrying machine in the loading zone.

According to the present invention, since the respective holding units of the first and the second carrying machines can be moved to the loading position common to the first and the second carrying machines in the loading zone, changing operations for changing workpieces respectively held by the first and the second carrying machines can be carried out at the same loading position. Distance for which the operator needs to move for changing workpieces respectively held by the holding units of the first and the second carrying machines can be shortened, and hence the carrying system can operate efficiently. When another robot is used for changing the workpiece held by the holding unit, the robot can operate in a narrow operation range and teaching work for teaching procedures to the robot can be simplified.

In the carrying system according to the present invention, preferably, each of the first carrying machine and the second carrying machine further includes an interlocking mechanism configured to turn the second link relative to the first link in coordination with a turning of the first link relative to the base so that the holding unit is moved along the carrying route when the first link is turned relative to the base.

According to the present invention, the second link of the carrying machine including the interlocking mechanism can be turned relative to the first link by turning the first link relative to the base. Thus a workpiece can be moved along a substantially arc carrying route by a single driving means. Therefore, the number of driving means needed by the carrying machine can be reduced and the construction of the carrying machine can be simplified, and the manufacturing cost of the carrying machines can be reduced.

In the carrying system according to the present invention, preferably, the holding unit of each of the first carrying machine and the second carrying machine is configured to rotate in the processing zone. Each of the first carrying machine and the second carrying machine further includes a transmission mode selecting mechanism configured to select a holding unit moving mode in which a driving force is transmitted so as to move the holding unit along the carrying route or a holding unit turning mode in which a driving force is transmitted so as to turn the holding unit about an axis of the holding unit.

According to the present invention, since the holding unit can rotate in the processing zone, a workpiece can be processed by a process that requires the workpiece to rotate, such as a painting process. The transmission mode selecting mechanism enables a single driving means to drive the holding unit for movement along the carrying route and to drive the holding unit for rotation in the processing zone. Thus, the number of the driving means of the carrying machine can be reduced and the construction of the carrying machine can be simplified, and the manufacturing cost of the carrying machine can be reduced. Since the carrying machine is provided with the linkage, both the holding unit moving mode and the holding unit turning mode use a rotary mechanism, and hence the transmission mode selecting mechanism for selecting either the holding unit moving mode or the holding unit rotating mode can be easily realized.

A processing equipment according to the present invention includes: the carrying system mentioned above; and a processing machine configured to spray paint on the workpiece carried to the processing zone by the carrying system.

According to the present invention, a workpiece can be carried between a processing zone where paint is sprayed on the workpiece and a loading zone where the workpiece is changed for another one by the carrying machine. Since the carrying machine can be installed in a smaller space, the processing equipment can be installed in a comparatively small space. Processing positions where workpieces carried by the two carrying machines are processed, respectively, can be positioned close to each other. Loading positions where workpieces are loaded on the two carrying machines, respectively, can be positioned close to each other. Thus the difference in processing conditions and carrying conditions between workpieces respectively carried by the two carrying machines can be reduced and processing work can be efficiently carried out.

BRIEF DESCRIPTION OF THE DRAWINGS

The above and other objects features and advantages of the present invention will become more apparent from the following description taken in connection with the accompanying drawings, in which:

FIG. 4A is a modification of a first rotating pulley of the first carrying machine;

DESCRIPTION OF THE PREFERRED EMBODIMENTS

Figure 1:
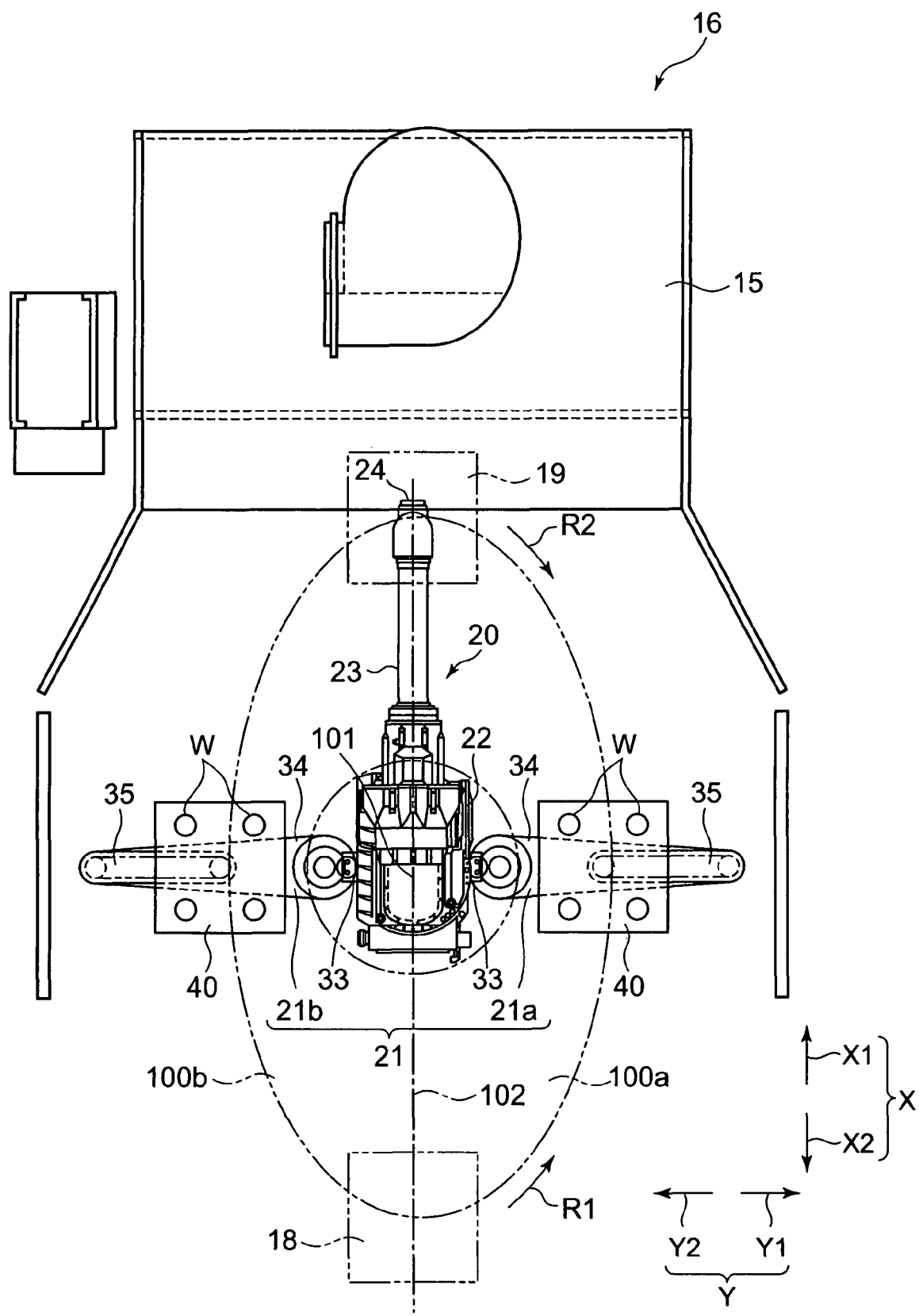
FIG. 1 is a plan view of a painting equipment in a first embodiment according to the present invention.
Figure 2:
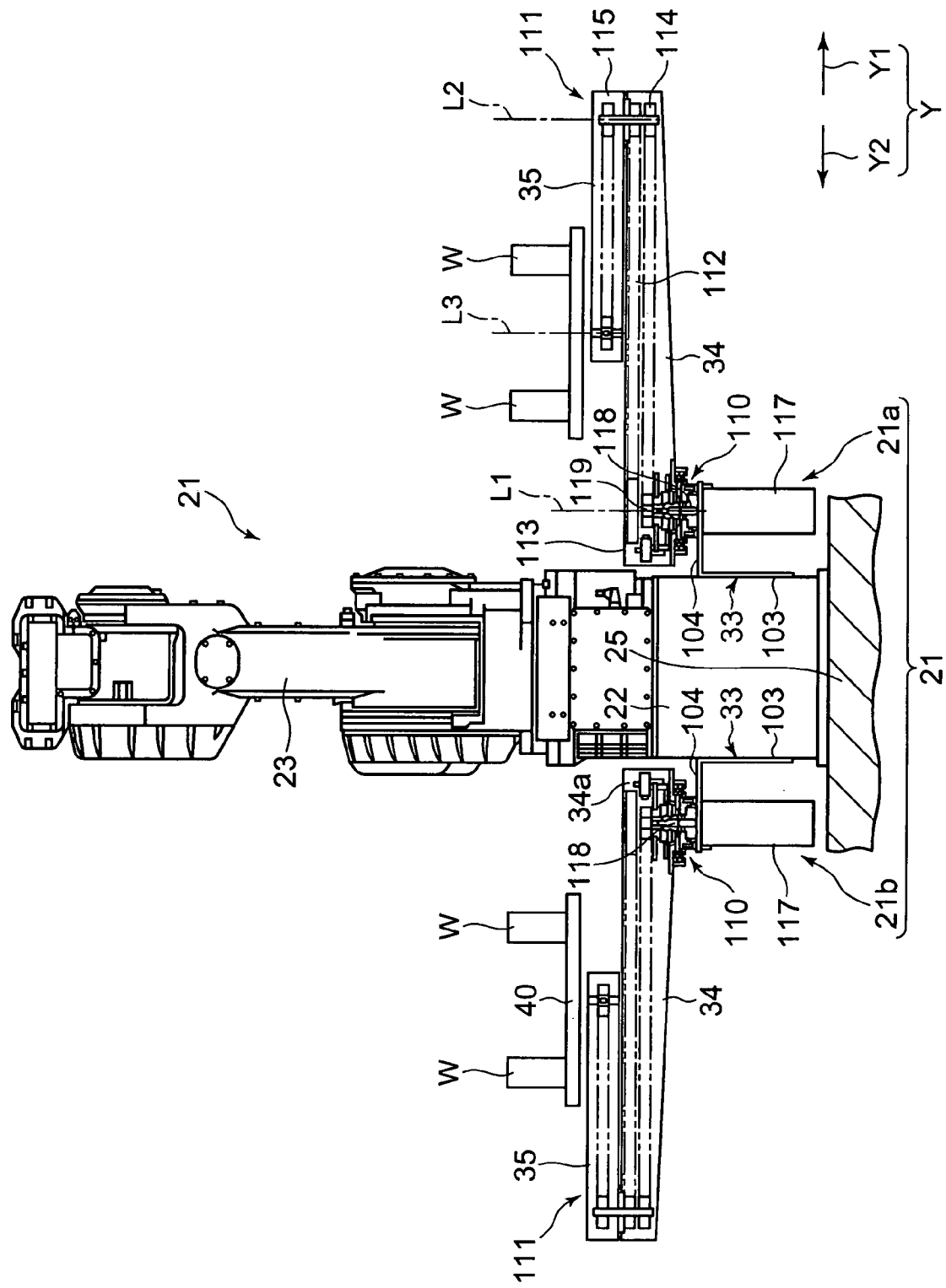
FIG. 2 is a side elevation of a carrying system installed in the painting equipment shown in FIG. 1.
Figure 3:
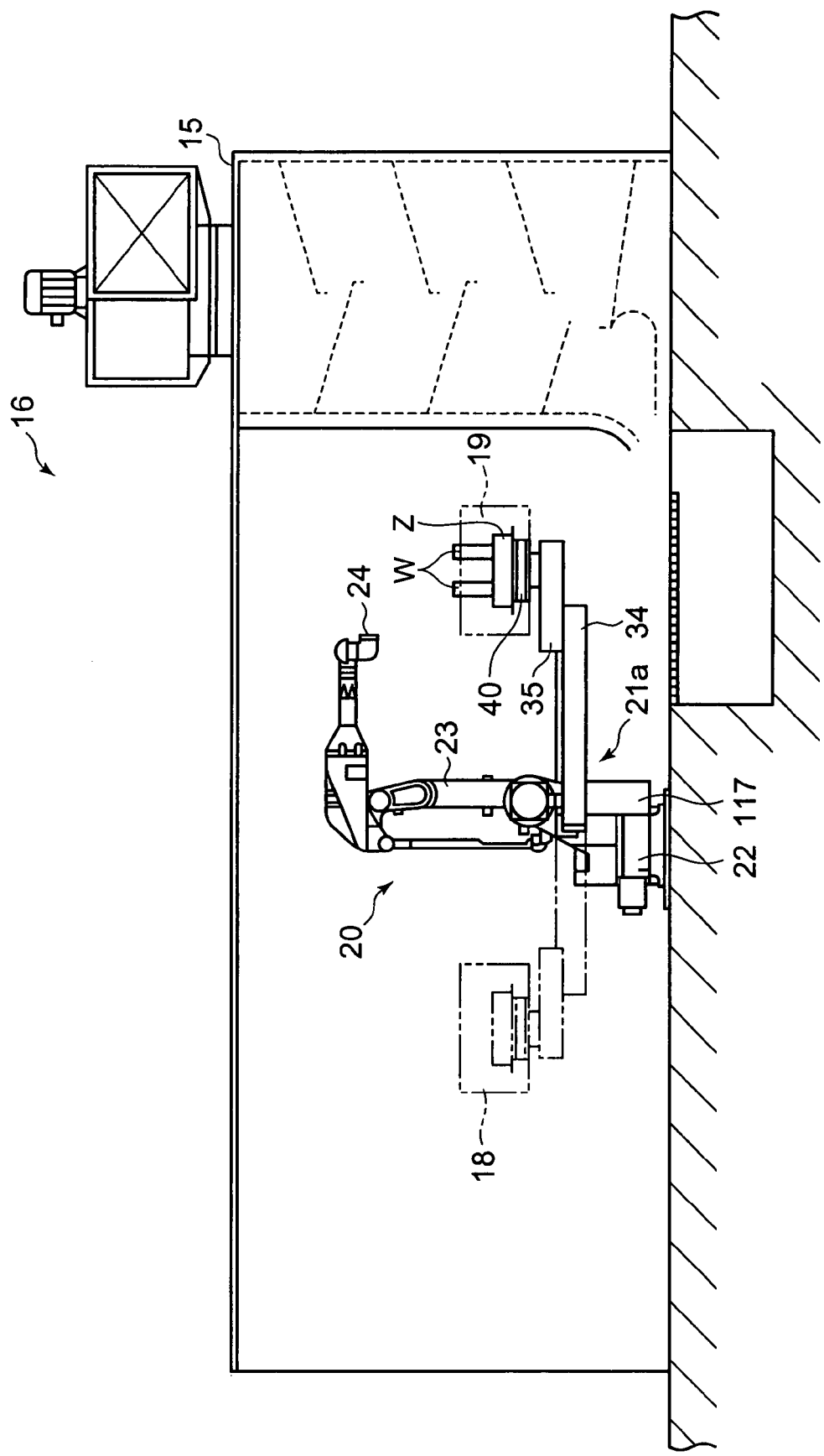
FIG. 3 is a side elevation of the painting equipment in a state where a workpiece is disposed at a painting position.

FIG. 1 is a plan view of a painting equipment 16 in a first embodiment according to the present invention, FIG. 2 is a side elevation of a carrying system 21 included in the painting equipment 16 and FIG. 3 is a side elevation of the painting equipment 16 in a state where a workpiece W is disposed at a painting position 19. In FIG. 3, the workpiece W disposed at a loading position 18 is indicated by two-point chain lines.

The painting equipment 16 paints the workpiece W. The painting equipment 16 includes a painting machine 20, the carrying system 21 and a painting booth 15. There is not any particular restriction on the workpiece W. The workpiece W may be a general article, such as the casing of a domestic electrical appliance, an automotive part or such.

The painting machine 20 paints the workpiece W disposed at the painting position 19 by spraying paint on the workpiece W. In this embodiment, the painting machine 20 is an articulated painting robot having a robot hand holding a spray nozzle 24. The painting machine 20 includes a pedestal 22, a robot arm 23 and the spray nozzle 24. The pedestal 22 is fixedly installed on the floor 25 in an upright position. The position of the pedestal 22 is dependent on the design of the painting machine 20. The pedestal 22 is disposed at the nearest possible distance from the painting position 19.

The robot arm 23 has a base end part joined to the pedestal 22, and a free end part to which the spray nozzle 24 is joined. A paint supply device, not shown, supplies the paint through a paint supply line, such as a hose, to the spray nozzle 24. The spray nozzle 24 sprays the paint unidirectionally through a nozzle hole. Spraying position and spraying direction can be changed during a painting operation by controlling the robot arm 23 of the painting machine 20 so as to change the position and attitude of the free end part of the robot arm 23. The irregular painting of the workpiece W can be prevented by changing the spraying position and the spraying direction during the painting operation. The painting machine 20 opens and closes the spray nozzle 24 to control paint spraying time.

The carrying system 21 includes a first carrying machine 21a and a second carrying machine 21b. The carrying machines 21a and 21b carry workpieces W between the painting position 19 where the workpiece W is painted and a loading position 18 where the workpiece W is replaced with another one. The loading position 18 and the painting position 19 are opposite to each other with respect to the pedestal 22. The loading position 18 and the painting position 19 are spaced a sufficiently long distance apart.

In this embodiment, an operator unloads painted workpieces W from the carrying machines 21a and 21b at the loading position 18 and loads other workpieces W not yet painted on the carrying machines 21a and 21b at the loading position 18. Thus workpiece changing operations for replacing painted workpieces W held by the carrying machines 21a and 21b with workpieces W not yet painted are carried out at the loading position 18. Thus the carrying machines 21a and 21b can hold workpieces W not yet painted at the loading position 18. Each of the carrying machines 21a and 21b holds a workpiece W not yet painted, and carries the same to the predetermined painting position 19 and carries the workpiece W painted at the painting position 19 to the loading position 18. The carrying machines 21a and 21b can independently operate to carry workpieces W.

In the following description, a direction from the painting machine 20 toward the painting position 19 is referred to as a forward direction X1 and a direction opposite the forward direction X1 will be referred to as a backward direction X2. The forward direction X1 and the backward direction X2 will be inclusively referred to as a longitudinal direction X. A direction perpendicular to the longitudinal direction X will be referred to as a transverse direction Y and a direction perpendicular to both the longitudinal direction X and the transverse direction Y will be referred to as a vertical direction Z. A first transverse direction Y1 and a second transverse direction Y2 are parallel to the transverse direction Y and opposite to each other with respect to the painting position 19. The longitudinal direction X and the transverse direction Y are contained in a horizontal plane.

The first carrying machine 21a carries a workpiece W between the loading position 18 and the painting position 19 along a first carrying route 100a. The first carrying route 100a has a substantially arc middle part protruding away from the pedestal 22 in the transverse direction Y1. The first carrying route 100*a* extends through an area closer to the pedestal 22 with respect to an imaginary circle having its center on the pedestal 22 and a radius corresponding to the distance between the pedestal 22 and either of the loading position 18 and the painting position 19.

The second carrying machine 21*b* carries a workpiece W between the loading position 18 and the painting position 19 along a second carrying route 100*b*. The second carrying route 100*b* has a substantially arc middle part protruding away from the pedestal 22 in the transverse direction Y2. The second carrying route 100*b* extends through an area closer to the pedestal 22 with respect to an imaginary circle having its center on the pedestal 22 and a radius corresponding to the distance between the pedestal 22 and either of the loading position 18 and the painting position 19.

The first carrying route 100*a* and the second carrying route 100*b* are axisymmetric with respect to a reference line 102 passing the center 101 of the pedestal 22 and parallel to the longitudinal direction X. The first carrying machine 21*a* and the second carrying machine 21*b* are identical in construction, except that the carrying routes 100*a* and 100*b* are axisymmetric. Therefore, only the first carrying machine 21*a* will be described and, sometimes, the description of the second carrying machine 21*b* will be omitted.

The loading position 18 and the painting position 19 are on the reference line 102 and are on the opposite sides, respectively, of the pedestal 22. The carrying machines 21*a* and 21*b* can carry a workpiece W to the loading position 18 and the painting position 19, which are common to the carrying machines 21*a* and 21*b*. When the carrying machine 21*a* (21*b*) carries a workpiece W forward from the loading position 18 to the painting position 19, the workpiece W is turned in a direction through 180° about the center 101 of the pedestal 22. When the carrying machine 21*a* (21*b*) carries a workpiece W backward from the painting position 19 to the loading position 18, the workpiece W is turned in a direction opposite the direction in which the workpiece W is turned when the workpiece W is carried forward through 180° about the center 101 of the pedestal 22.

Each of the carrying machines 21*a* and 21*b* is provided with a linkage. More specifically, each of the carrying machines 21*a* and 21*b* is provided with a linkage including a base 33, a first link 34, a second link 35, a holding unit 40, a first joint 110, a second joint 111 and a third joint 112.

The base 33 is fixed to the pedestal 22. The respective bases 33 of the first carrying machine 21*a* and the second carrying machine 21*b* are fixed, respectively, to a side wall of the pedestal 22 facing the transverse direction Y1 and a side wall of the same facing the transverse direction Y2. Each of the bases 33 has a shape substantially resembling an L-shape. Each of the bases 33 has a vertical part 103 fixed to the pedestal 22 and a horizontal part 104 protruding in the transverse direction Y from the vertical part 103.

The first link 34 is elongated. The first link 34 has a base end part 113 connected to the horizontal part 104 of the base 33 by the first joint 110. The first joint 110 connects the first link 34 to the base 33 such that the first link 34 can turn about a first axis L1 of turning. The first axis L1 of turning is on the first joint 110 and is perpendicular to both the longitudinal direction X and the transverse direction Y, that is, the first axis L1 of turning is vertical. The first axis L1 of turning extends through the horizontal part 104 of the base 33 and the base end part 113 of the first link 34.

The second link 35 is elongated. The second link 35 has a base end part 115 connected to a free end part 114 of the first link 34 by the second joint 111. The second joint 111 connects the second link 35 to the first link 34 such that the second link 35 can turn about a second axis L2 of turning. The second axis L2 of turning is on the second joint 111 and is perpendicular to both the longitudinal direction X and the transverse direction Y, that is, the second axis L2 of turning is vertical. The second axis L2 of turning extends through the free end part 114 of the first link 34 and the base end part 115 of the second link 35.

The holding unit 40 holds a workpiece W detachably. The holding unit 40 has a square major surface contained in a horizontal plane. The holding unit 40 may be provided with a holding device for holding a workpiece W. The holding device can be set in either of a holding state for holding a workpiece W and a releasing state for releasing a workpiece W. The holding device is, for example, a pneumatic chuck. When the holding unit 40 is provided with a pneumatic chuck, the painting equipment 16 has a suction device for sucking air, and a suction line connecting the pneumatic chuck to the suction device. The suction line is formed by a hose or the like. The suction device is a vacuum pump or the like. The holding device enables the holding unit 40 to hold a workpiece W more securely.

Figure 4:
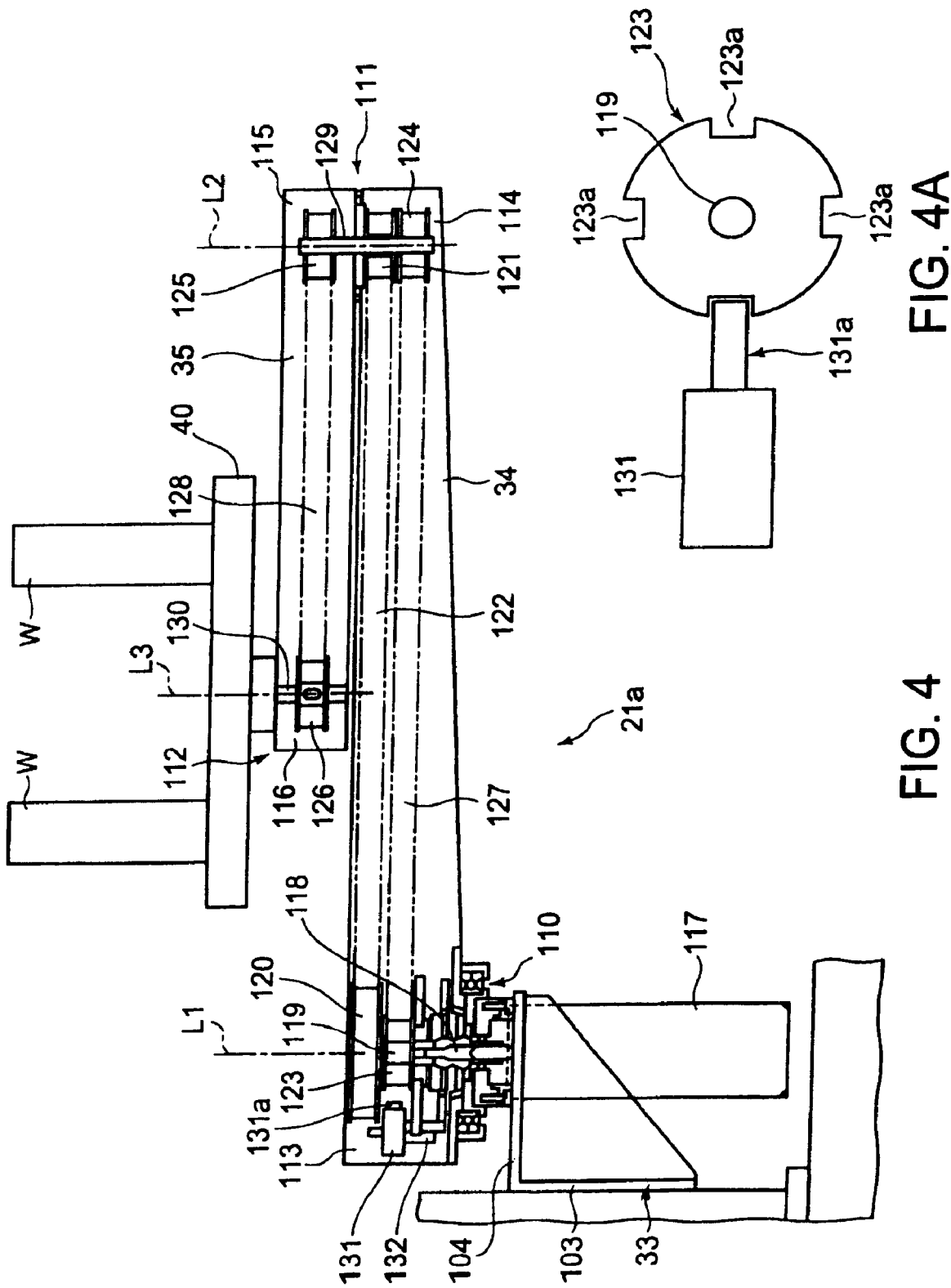
FIG. 4 is a side elevation of a first carrying machine included in the carrying system.

Referring to also FIG. 4, the holding unit 40 is joined to a free end part 116 of the second link 35 by the third joint 112. The third joint 112 connects the holding unit 40 such that the holding unit 40 is turnable about a predetermined third axis L3 of turning. The third axis L3 of turning is set on the third joint 112 and is perpendicular to the longitudinal direction X and the transverse direction Y, that is, the third axis L3 of turning is vertical. The third axis L3 of turning passes the center of gravity of the holding unit 40 and the free end part 116 of the second link 35.

Each of the carrying machines 21*a* and 21*b* can move the holding unit 40 in the longitudinal direction X and the transverse direction Y by turning the first link 34 relative to the base 33 and by turning the second link 35 relative to the first link 34. Thus the holding unit 40 can be moved along the substantially arc carrying route extending between the loading position 18 and the painting position 19. The holding unit 40 can be turned about the third axis L3 of turning on the second link 35.

The carrying machines 21*a* and 21*b* can individually operate. Therefore, the first carrying machine 21*a* (the second carrying machine 21*b*) can carry a workpiece W while a workpiece W held by the second carrying machine 21*b* (the first carrying machine 21*a*) is being painted by the painting machine 20 or is being replaced with another workpiece W.

Each of the carrying machines 21*a* and 21*b* is provided with a motor 117 for driving the first link 34 for turning about the first axis L1 of turning. The motor 117 has a motor casing fixed to the base 33 and an output shaft 119 connected to the first link 34 by a reduction gear 118. Each of the carrying machines 21*a* and 21*b* is provided with an interlocking mechanism and a transmission mode selecting mechanism.

The interlocking mechanism turns the second link 35 about the second axis L2 of turning relative to the first link 34 in coordination with the turning of the first link 34 about the first axis L1 of turning relative to the base 33. The transmission mode selecting mechanism selects a holding unit moving mode in which driving force is transmitted so as to move the holding unit 40 along the carrying route or a holding unit turning mode in which driving force is transmitted so as to turn the holding unit 40 about its own axis. Thus the holding unit 40 can be moved along the carrying route and can be turned about its own axis at the painting position 19 by the single motor 117.

The interlocking mechanism includes a first interlocking pulley 120, a second interlocking pulley 121 and an interlocking belt 122 extended between the interlocking pulleys 120 and 121. The first interlocking pulley 120 is placed on the base end part 113 of the first link 34 and fixed to the base 33. The second interlocking pulley 121 is supported on the free end part 114 of the first link 34 and is fixed to the base end part 115 of the second link 35.

The first interlocking pulley 120 and the second interlocking pulley 121 are turnable relative to the first link 34 about the first axis L1 of turning and the second axis L2 of turning, respectively. The interlocking belt 122 is endless and is wound round the first interlocking pulley 120 and the second interlocking pulley 121. The interlocking belt 122 transmits the rotation of the interlocking pulley 120 relative to the first link 34 to the second interlocking pulley 121.

The first interlocking pulley 120 is fixed to the base 33. Therefore, when the first link 34 turns about the first axis L1 of turning, the first interlocking pulley 120 turns about the first axis L1 of turning relative to the first link 34. When the first link 34 thus turns, the interlocking belt 122 turns the second interlocking pulley 121 about the second axis L2 of turning. Consequently, the second link 35 turns together with the second interlocking pulley 121 about the second axis L2 of turning.

The second link 35 can be thus turned relative to the first link 34 in coordination with the turning of the first link 34 relative to the base 33. Thus both the first link 34 and the second link 35 can be turned by the single motor 117.

Each of the carrying machines 21a and 21b has a rotary mechanism for turning the holding unit 40 about its own axis. The rotary mechanism includes a first rotating pulley 123, a second rotating pulley 124, a third rotating pulley 125, a fourth rotating pulley 126, a first rotating belt 127 and a second rotating belt 128.

The first rotating pulley 123 is placed on the base end part 113 of the first link 34 and is connected through the reduction gear 118 to the output shaft 119 of the motor 117. The first rotating pulley 123 can turn about the first axis L1 of turning relative to the first link 34. The second rotating pulley 124 is placed on the free end part 114 of the first link 34. The second rotating pulley 124 can turn about the second axis L2 of turning relative to the first link 34. The first rotating belt 127 is endless and is wound round the first rotating pulley 123 and the second rotating pulley 124. The first rotating belt 127 transmits the rotation of the first rotating pulley 124 relative to the first link 34 to the second rotating pulley 124.

The third rotating pulley 125 is placed on the base end part 115 of the second link 35 so as to be turnable about the axis L2 of turning relative to the second link 35. The second rotating pulley 124 and the third rotating pulley 125 are fixedly mounted on opposite end parts, respectively, of a first connecting shaft 129. The fourth rotating pulley 126 is placed on the free end part 116 of the second link 35. The fourth rotating pulley 126 is turnable about the third axis L3 of turning relative to the second link 35. The second rotating belt 128 is endless and is wound round the third rotating pulley 125 and the fourth rotating pulley 126. The second rotating belt 128 transmits the rotation of the third rotating pulley 125 relative to the second link 35 to the fourth rotating pulley 126. The fourth rotating pulley 126 and the holding unit 40 are fixedly mounted on the opposite end parts, respectively, of a second connecting shaft 130.

The first rotating pulley 123 is driven for rotation about the first axis L1 of turning by the motor 117. The, the first interlocking belt 127 rotates the second rotating pulley 124 about the second axis L2 of turning, and the third rotating pulley 125 rotates together with the second rotating pulley 124 about the second axis L2 of turning. When the second rotating pulley 125 is driven for rotation about the second axis L2 of turning, the second rotating belt 128 rotates the fourth rotating pulley 126 about the third axis L3 of turning. Consequently, the holding unit 40 turns together with the fourth rotating pulley 124 about the third axis L3 of turning. Thus power can be transmitted by the power transmission mechanism to turn the holding unit 40 about the third axis L3 of turning.

The carrying system in the first embodiment is provided with the transmission mode selecting mechanism for selecting the holding unit moving mode or the holding unit turning mode. The transmission mode selecting mechanism includes a stopping device 131 and a fixed member 132. In the first embodiment, the stopping device 131 is a pneumatic cylinder actuator. The pneumatic cylinder actuator moves a pressing member 131a reciprocally. The pressing member 131a can be moved selectively to a turn restraining position or a turn releasing position. The pressing member 131a moved to the restraining position is pressed against the first rotating pulley 123 to restrain the first rotating pulley 123 from turning. The pressing member 131a retracted to the releasing position is detached from the first rotating pulley 123 to permit the first rotating pulley 123 to turn. The pneumatic cylinder actuator is supported on the fixed member 132 which is fixed to the first link 34.

When the pressing member 131a is pressed against the first rotating pulley 123 to restrain the first rotating pulley 123 from turning about the first axis L1 of turning, the driving force of the motor 117 is transmitted through the first rotating pulley 123, the pressing member 131a, the fixed member 132 and the first link 34 to turn the first link 34 about the first axis L1 of turning relative to the base 33. When the first link 34 is thus turned, the second link 35 can be turned by the interlocking mechanism in coordination with the turning of the first link 34 to move the holding unit 40 along the carrying route.

Preferably, the first rotating pulley 123 is modified as shown in FIG. 4A so that the first rotating pulley 123 is provided with recesses 123a at appropriate positions on the top portion thereof. In this constitution, the distal end of the pressing member 131a of the stopping device 131 is inserted into one of the recesses 123a so that the first rotating pulley 123 is surely prevented from turning about the first rotational axis thereof.

When the pressing member 131a is detached from the first rotating pulley 123, the driving force is not transmitted to the first link 34 and the first link 34 is prevented from turning. When the first rotating pulley 123 is turned about the first axis L1 of turning, the rotary mechanism turns the holding unit 40 about its own axis. Thus the transmission mode selecting mechanism selects the transmission mode to move the holding unit 40 along the carrying route or to turn the holding unit 40 about its own axis.

Figure 5:
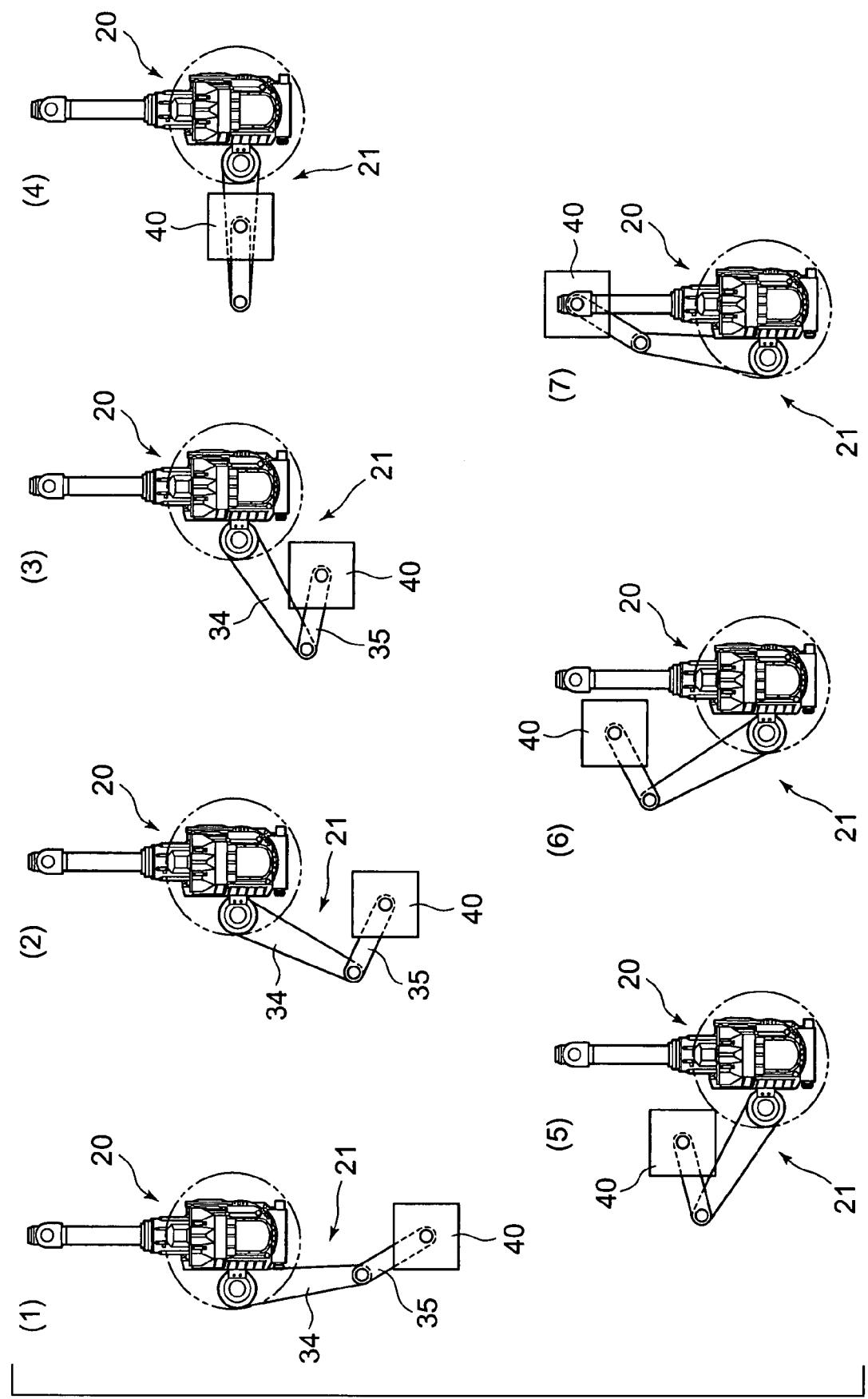
FIG. 5 includes plan views (1) to (7) of assistance in explaining a carrying route along which a holding unit is moved.
Figure 6:
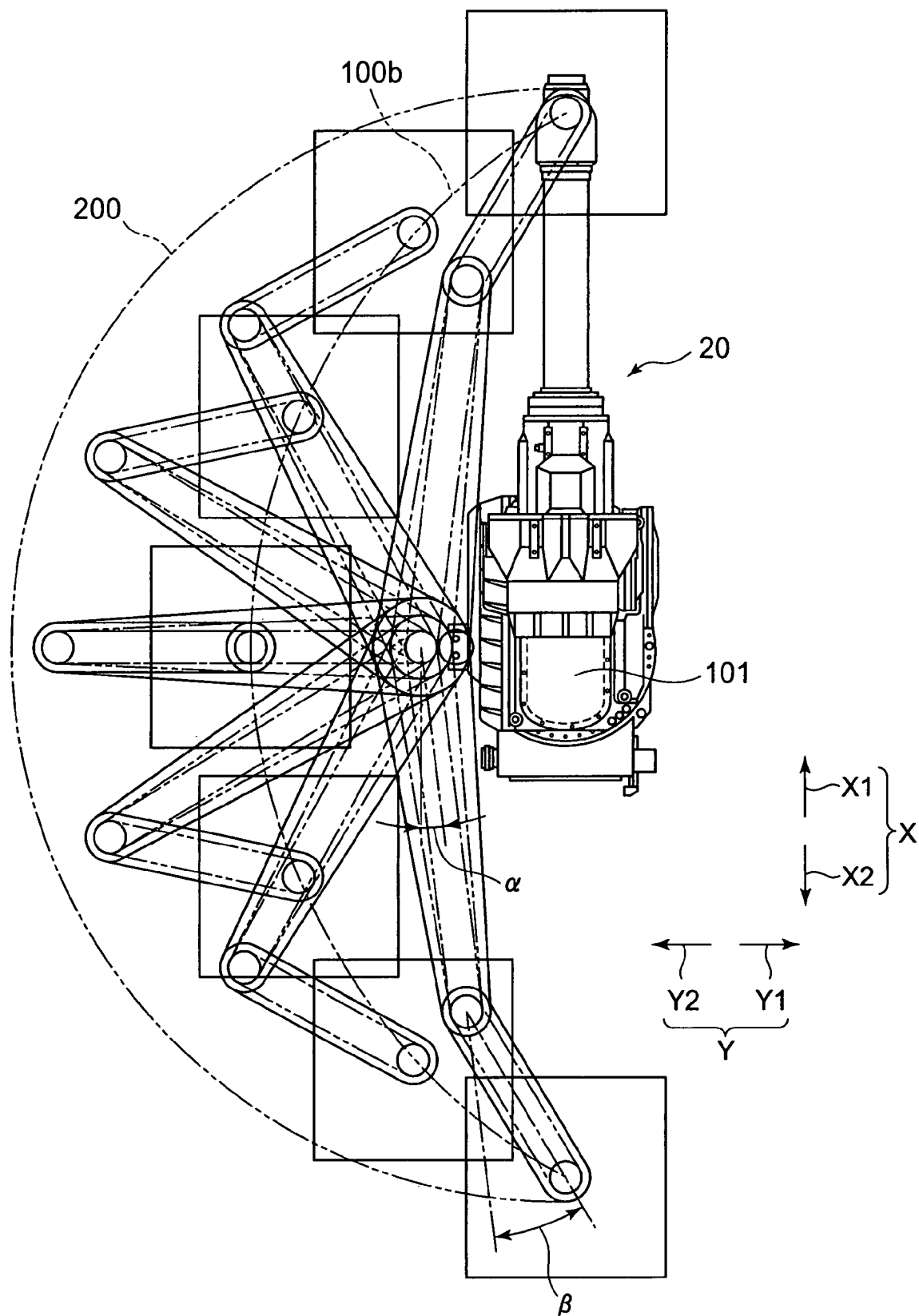
FIG. 6 is a plan view of assistance in explaining a carrying route along which the holding unit is moved.

FIGS. 5(1)-(7) and 6 are plan views of assistance in explaining the carrying route along which the holding unit 40 is moved. The holding unit 40 is moved sequentially past positions shown in (1) to (7) of FIG. 5 in that order from the loading position 18 shown in FIG. 5(1) to the painting position 19 shown in FIG. 5(7). FIG. 6 is a plan view of the carrying system 21 formed by superposing plan views of the carrying system 21 changing in steps shown in (1) to (7) of FIG. 5.

The second link 35 can be turned about the second axis L2 of turning by turning the first link 34 about the first axis L1 by determining the respective diameters of the first interlocking pulley 120 and the second interlocking pulley 121 so that the diametral ratio between the interlocking pulley 120 and 121 is optimum. The loading position 18 and the painting position 19 are supposed to be point-symmetrical with respect to the center of the pedestal 22. Moreover, it is supposed that the first link 34 is inclined to the longitudinal direction X at an angle $\alpha$ and an angle $\beta$ is formed between the first link 34 and the second link 35 when the holding unit 40 is at the loading position 18. The diametrical ratio between the pulleys 120 and 121 is determined such that the second link 35 is turned through an angle of $360°-2\beta$ when the first link 34 is turned through an angle of $180°+2\alpha$ relative to the base 33. Interference between a workpiece W and the pedestal 22 can be avoided and the workpiece W can be carried along the substantially arc carrying route when the distance between the first axis L1 of turning and the second axis L2 of turning is longer than the distance between the second axis L2 of turning and the third axis L3 of turning. In other words, the respective lengths of the links 34 and 35 are determined so that the movement of the workpiece W may not be interfered with the pedestal 22. The respective lengths and the angular displacements of the first link 34 and the second link 35 are determined properly taking into consideration the loading position 18, the painting position 19, the shape of the workpiece W and the size of an available space.

When the respective lengths of the links 34 and 35 and the values of those parameters are thus determined, the holding unit 40 can be moved along the carrying route 100a (100b). The holding unit 40 can be moved along the carrying route 100a (100b) extending through the area closer to the pedestal 22 with respect to an imaginary circle 200 having its center on the pedestal 22 and a radius corresponding to the distance between the pedestal 22 and either of the loading position 18 and the painting position 19. Thus the holding unit 40 can be moved through an area extending in the vicinity of the pedestal 22 and hence the carrying system 21 can be installed in a comparatively small space even if the loading position 18 and the painting position 19 are spaced a long distance apart.

Each of the carrying machines 21a and 21b having the linkage can easily carry a workpiece W along the substantially arc carrying route. A workpiece can be carried round the pedestal 22 along the substantially arc route near the pedestal. Thus the first carrying machine 21a and the second carrying machine 21b can use the loading position 18 in common. Similarly, the first carrying machine 21a and the second carrying machine 21b can use the painting position 19 in common.

Since the base 33 is attached to the pedestal 22, a workpiece W can be easily carried along the carrying route by turning the first link 34 relative to the base 33. Since the first link 34 is connected to the horizontal part 104 of the base 33 by the first joint 110, the pedestal 22 will not interfere with the first link 34 during the angular displacement of the first link 34. The first link 34 and the second link 35 overlap each other when the holding unit 40 passes near the pedestal 22. More concretely, when the holding unit 40 is on a straight line extending to the transverse direction Y and passing the center 101 of the pedestal 22, the first link 34 and the second link 35 overlap each other. Therefore, a workpiece W can be carried through a space near the pedestal 22.

Since each of the carrying machines 21a and 21b uses the linkage for carrying a workpiece W, any cables for supplying power to motors are unnecessary, any protective members, such as CABLE BEAR®, are unnecessary, along the first link 34 or the second link 35, and the holding unit 40 can be held at a low height and hence the operator can easily load a workpiece W on the holding unit 40.

Figure 7:
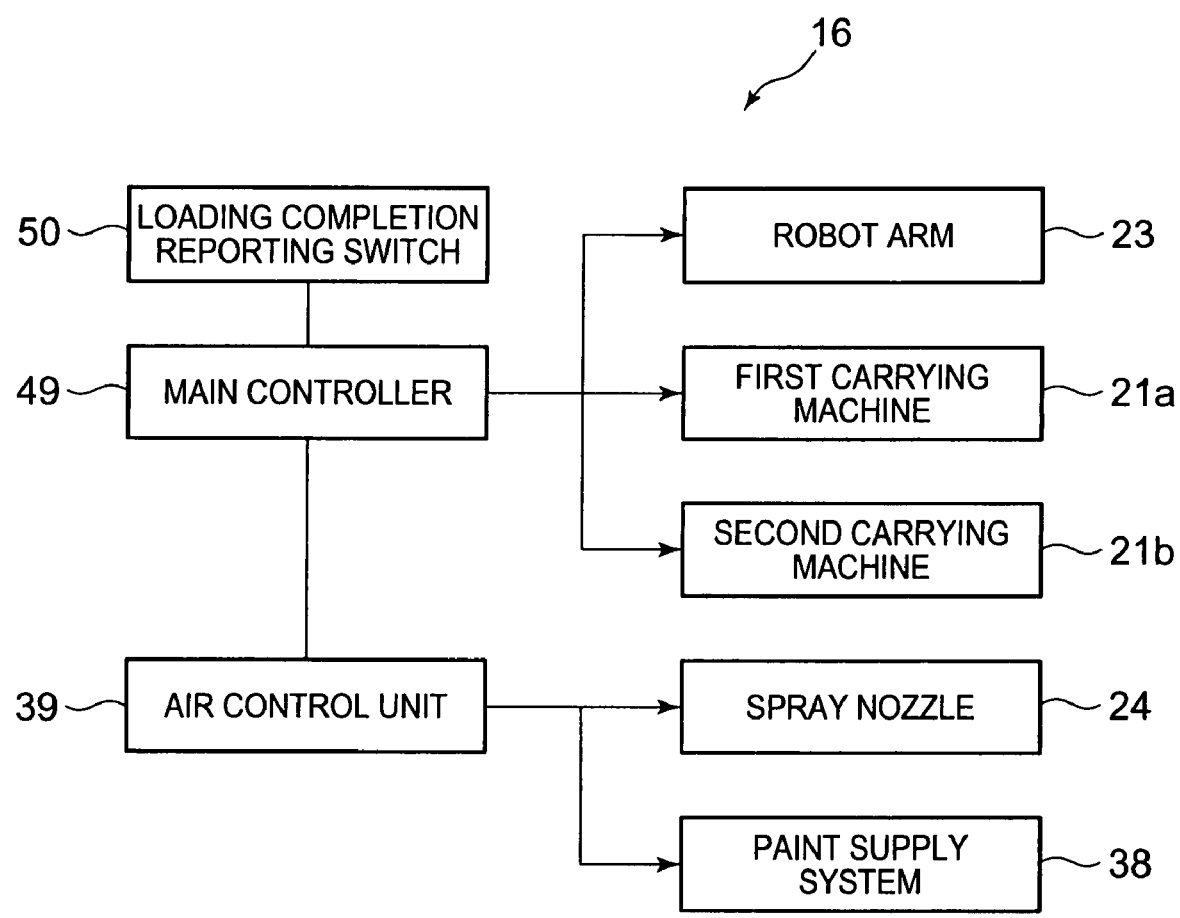
FIG. 7 is a block diagram of a main electrical system of the painting equipment in the first embodiment.

FIG. 7 is a block diagram of the main electrical system of the painting equipment 16. The painting equipment 16 is provided with a loading completion detecting means for detecting the completion of loading work for loading a workpiece W on the holding unit 40. When the operator loads a workpiece W on the holding unit, a loading completion reporting switch is used for sending a loading completion signal to a main controller. The operator pushes the loading completion reporting switch on after completing loading a workpiece W on the holding unit 40 to inform a main controller of the completion of loading work for loading the workpiece W on the holding unit 40.

The painting equipment 16 includes a main controller 49, an air control unit 39 and a loading completion reporting switch 50. The main controller 49 controls the general operations of the painting equipment 16. The main controller 49 is provided with an input device, which is operated by an operator to enter a painting procedure to be carried out by the painting equipment 16. The input device is operated to enter information specifying the painting operation of the painting machine 20, such as the movement of the spray nozzle 24 and paint spraying timing. The input device is, for example, a keyboard, a switch board provided with switches or a teach pendant.

The main controller 49 controls the robot arm 23 of the painting machine 20, the carrying machines 21a and 21b and the air control unit 39. The loading completion reporting switch 50 is operated to give a loading completion signal to the main controller 49. The main controller 49 controls the carrying machines 21a and 21b. The main controller 49 gives a motor drive signal to operate the motors 117 and a motor stop signal to stop the motors 117 to the motor 117 and gives a pressing member advancing signal to advance the pressing member 131a to its working position and a pressing member retracting signal to retract the pressing member from the working position to the pneumatic cylinder actuator.

The main controller 49 controls the painting machine 20 to move the robot arm 23 so as to locate the spray nozzle 24 held on the robot arm 23 at predetermined positions in predetermined attitudes. The main controller 49 controls the first carrying machine 21a (the second carrying machine 21b) to move the holding unit 40 along the carrying route and to turn the holding unit 40. When the holding unit 40 is provided with a holding device, the main controller 49 controls the first carrying machine 21a (the second carrying machine 21b) to set the holding device selectively in a holding state or a releasing state.

The air control unit 39 controls a paint supply system 38 and the spray nozzle 24. The air control unit 39 controls the paint supply system 38 to set the paint supply system 38 selectively in a paint supplying state or a paint stopping state. The air control unit 39 controls the spray nozzle 24 to adjust paint spray amount, paint diffusing rate and such. The air control unit 39 controls the paint supply system 38 and the spray nozzle 24 on the basis of commands given thereto by the main controller 49. Thus the main controller 49 controls the robot arm 23 of the painting equipment 16, the carrying machines 21a and 21b and the air control unit 39 to carry and paint a workpiece W.

Figure 8:
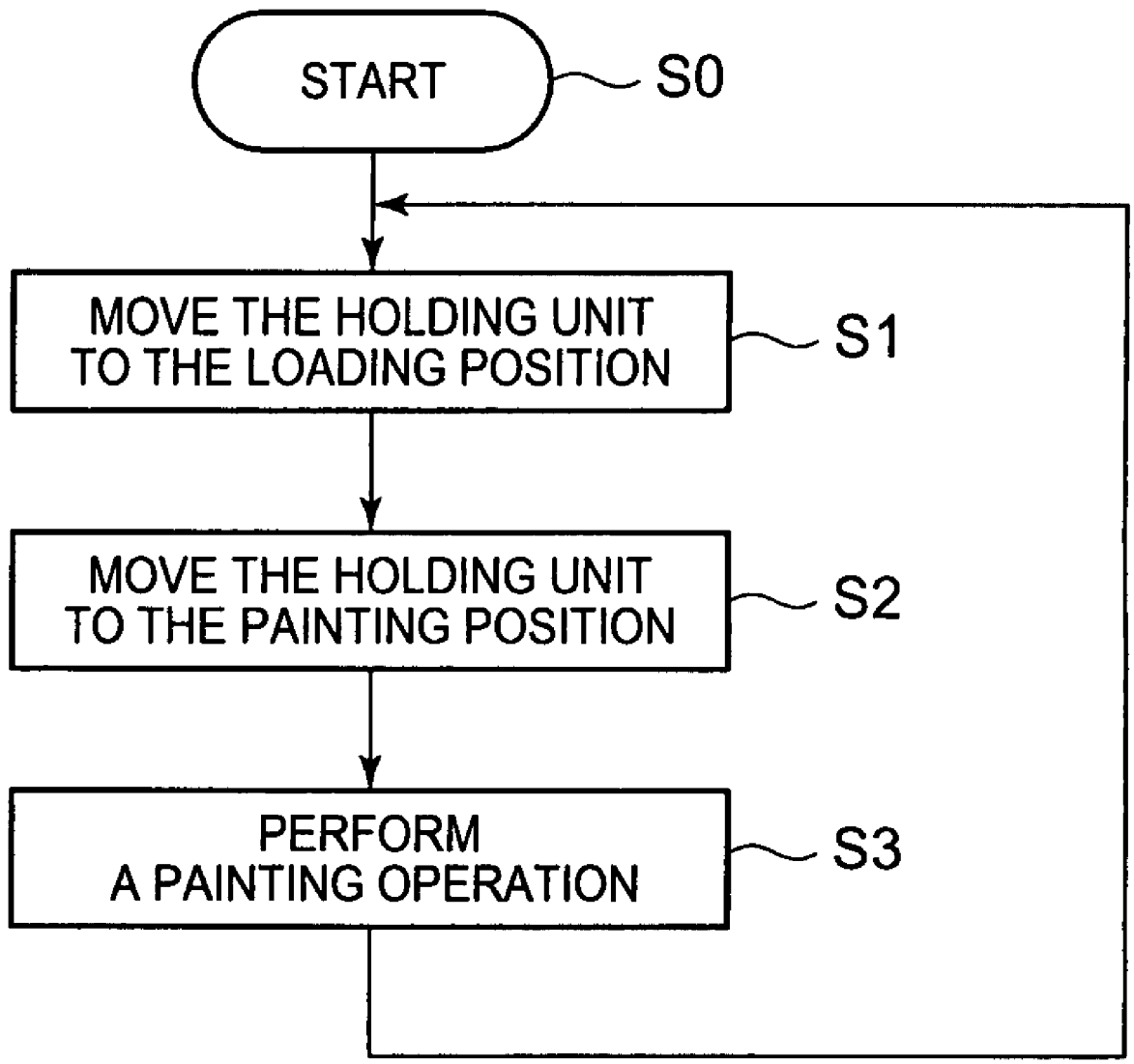
FIG. 8 is a flow chart of a painting operation control procedure to be carried out by a main controller.

FIG. 8 is a flow chart of a painting operation control procedure to be carried out by the main controller 49. Control procedures respectively for controlling the carrying machines 21a and 21b to be carried out by the main controller 49 are the same and hence only the control procedure for controlling the first carrying machine 21a will be described and the description of the control procedure for controlling the second carrying machine 21b will be omitted.

The painting operation control procedure is started in step s0. When the operator gives the main controller 49 a painting operation start command, a painting operation is started.

In step s1, the main controller 49 controls the first carrying machine 21a to move the holding unit 40 of the first carrying machine 21a to the loading position 18. If the holding unit 40 of the second carrying machine 21b is at the loading position 18, the holding unit 40 of the first carrying machine 21a is kept waiting near the loading position 18 until the holding unit 40 of the second carrying machine 21b is moved away from the loading position 18.

Upon the arrival of the holding unit 40 at the loading position 18, the main controller 49 sets the holding unit 40 in a releasing state. Subsequently, the operator unloads a painted workpiece W from the holding unit 40 and loads a workpiece W not yet painted on the holding unit 40. After a workpiece changing operation for changing the workpieces W has been completed, the operator pushes the loading completion reporting switch 50 on, and then the main controller 49 executes step s2. This workpiece changing operation may be carried out by a loading machine, such as another articulated robot.

In step s2, the main controller 49 controls the first carrying machine 21a to move the holding unit 40 to the painting position 19. If the holding unit 40 of the second carrying machine 21b is at the painting position 19, the holding unit 40 of the first carrying machine 21a is kept waiting near the painting position 19 until the holding unit 40 of the second carrying machine 21b is moved away from the painting position 19. After the holding unit 40 has been positioned at the painting position 19, step s3 is executed.

In step s3, main controller 49 controls the painting machine 20 to carry out a painting operation for painting the workpiece W held by the holding unit 40. The main controller 49 controls the paint supply system 38 to spray paint on the workpiece W by the spray nozzle 24 and moves the robot arm to vary spraying position and spraying direction. The main controller 49 controls the first carrying machine 21a to turn the holding unit 40 about the third axis L3 of turning. Thus paint is sprayed from different directions on the workpiece W and the workpiece W is being turned, the workpiece W can be painted uniformly. An optimum painting sequence specifying painting time, spraying directions, workpiece rotating speed and process parameters for each workpiece W is stored beforehand in the main controller 49. The painting operation control procedure returns to step s1 after the painting operation for painting the workpiece W held by the holding device 40 of the first carrying machine 21a has been completed.

The main controller 49 repeats a loop of steps s1 to s3 to move the holding unit 40 of the first carrying machine 21a between the loading position 18 and the painting position 19 and to turn the holding unit 40 until the operator gives the main controller 49 a painting end command. The painting operation is terminated when a painting end command is given to the main controller 49. The main controller 49 controls the first carrying machine 21a and the second carrying machine 21b simultaneously to make the first carrying machine 21a and the second carrying machine 21b carry out similar operations individually. Thus the second carrying machine 21b can carry a workpiece W regardless of time spent by the first carrying machine 21a for painting and changing workpieces W. Consequently, overall work time can be curtailed.

The carrying machines 21a and 21b carry workpieces W along the carrying routes 100a and 100b, respectively, and each of the carrying routes 100a and 100b is closer to the pedestal 22 with respect to the imaginary circle 200 having its center on the pedestal 22 and a radius corresponding to the distance between the pedestal 22 and either of the loading position 18 and the painting position 19. Therefore, a space necessary for installing the carrying system 21 is comparatively small and a site for the carrying system 21 can be effectively utilized. Consequently, a space necessary for installing the painting equipment 16 including the carrying system 21 and the painting machine 20 is comparatively small.

The carrying machines 21a and 21b can use the loading position 18 and the painting position 19 in common. Thus the difference in processing conditions between workpieces carried respectively by the first carrying machine 21a and the second carrying machine 21b can be reduced to the least possible extent. Therefore, the painting operation can be efficiently carried out and the variation of processing quality can be suppressed.

The respective carrying operations of the carrying machines 21a and 21b can be independently carried out. Therefore, the first carrying machine 21a (the second carrying machine 21b) can carry a workpiece W while a workpiece W held by the second carrying machine 21b (the first carrying machine 21a) is being processed or being replaced with another one. Consequently, waiting time for which the carrying machines 21a and 21b are inoperative can be reduced and the efficiency of the painting process can be improved.

As mentioned above, the difference in painting conditions between workpieces W carried by the carrying machines 21a and 21b can be reduced by using the painting position 19 in common by the carrying machines 21a and 21b and hence the variation of painting quality can be prevented. The painting machine 20 can always carry out the same painting operation for workpieces respectively carried by the carrying machines 21a and 21b. Therefore, teaching work for teaching different painting procedures respectively for the carrying machines 21a and 21b to the painting machine 20 is not necessary and hence teaching work can be simplified.

The painting equipment needs a special space and a painting booth for the painting position. A large painting booth increases the initial const and the running cost of the painting equipment. The painting equipment in the first embodiment needs a comparatively small special space and a comparatively small painting booth because the painting position is used in common by both the carrying machines 21a and 21b. Therefore, the cost of work can be reduced. Paint mist can be efficiently removed by suction from the comparatively small painting booth and hence the contamination of the environment around the painting equipment with paint mist can be prevented. Efficient removal of paint mist prevents the contamination of the workpiece W with dust and improves yield.

Since the loading position 18 is used in common by both the carrying machines 21a and 21b, the workpiece changing operation for replacing a workpiece W held by the first carrying machine 21a (the second carrying machine 21b) for another one and the workpiece changing operation for replacing a workpiece W held by the second carrying machine 21b (the first carrying machine 21a) for another one can be carried out at the same place. Therefore, distance for which the operator needs to move to carry out the workpiece changing work for replacing a workpiece W held by the holding unit with another one can be shortened and hence working efficiency can be improved. When a robot is used for carrying out the workpiece changing operation for changing a workpiece W held by the holding unit 40 with another one, the robot can operate in a comparatively narrow working range and teaching work can be simplified.

Since each of the carrying machines 21a and 21b is provided with the interlocking mechanism, the second link 35 can be turned relative to the first link 34 by turning the first link 34 relative to the base 33. Thus a workpiece W can be moved along the substantially arc carrying route by the single motor 117. Therefore, the number of the driving means needed by the carrying machine can be reduced and the construction of the carrying machines can be simplified.

Each of the carrying machines 21a and 21b includes a transmission mode selecting mechanism. The transmission mode selecting mechanism enables the single motor 117 to drive the holding unit 40 for movement along the carrying route and to drive the holding unit 40 for rotation. Thus the number of the driving means of the carrying machine can be reduced and the construction of the carrying machine can be simplified. Since each of the carrying machines 21a and 21b is provided with the linkage, both the holding unit moving mode and the holding unit rotating mode use the rotary mechanism and hence the transmission mode selecting mechanism for selecting either the holding unit moving mode or the holding unit rotating mode can be easily realized. Thus the carrying machines 21a and 21b and the painting equipment 16 are simple in construction and can be manufactured at low costs. Therefore, the cost of the painting equipment is comparatively low.

The position of the pedestal 22 may be determined unconnectedly with the carrying machines 21a and 21b. The pedestal 22 can be disposed near the painting booth. The pedestal 22 will not interfere with the first link 34. The painting machine 20 can operate unconnectedly with the operation of the carrying machines 21a and 21b. The painting machine 20 may be a general-purpose articulated robot. The painting machine 20 does not need to move over the carrying machines 21a and 21b. Therefore, the arm of the painting machine 20 does not need to be undesirably long and the painting machine 20 can be formed in a comparatively small size.

In the painting equipment 16, the single motor 117 for driving the carrying machine 21a (21b) to carry a workpiece W is disposed near the pedestal 22 apart from the painting position 19. Therefore, the motor 117 will not be contaminated with paint. The motor 117 for the painting equipment is constructed so as to prevent paint from entering the motor 117. The motor 117 for painting is generally more expensive than general-purpose motors. The number of the motors 117 of the carrying system in this embodiment is less than that of motors of the known carrying system. Therefore, the manufacturing cost of the carrying system is less than that of the known carrying system.

Figure 9:
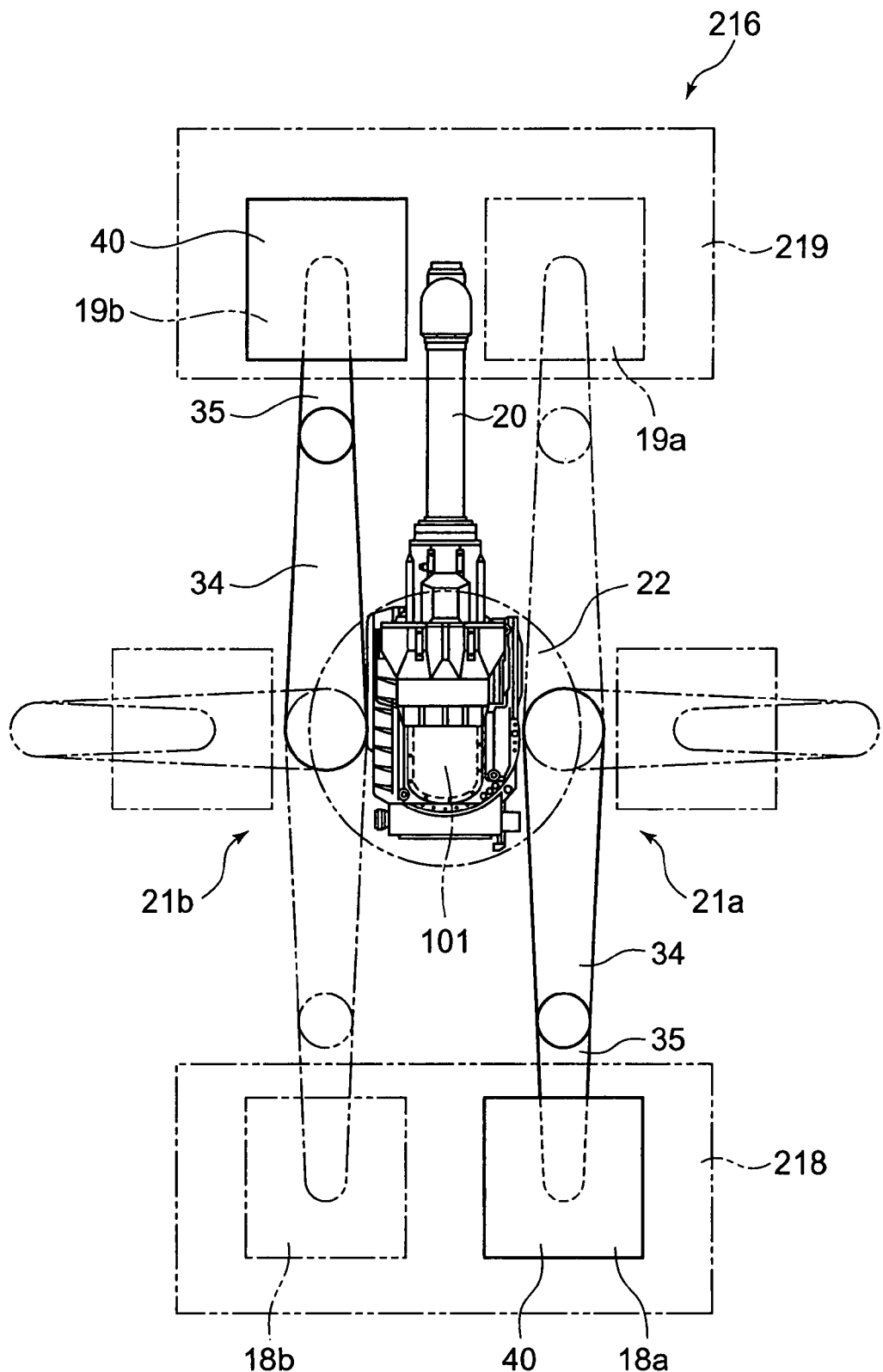
FIG. 9 is a fragmentary plan view of a painting equipment in a second embodiment according to the present invention.

FIG. 9 is a fragmentary plan view of a painting equipment 216 in a second embodiment according to the present invention. The construction of the painting equipment 216 in the second embodiment is similar to that of the painting equipment 16 in the first embodiment. Parts and mechanisms of the painting equipment 216 in the second embodiment like or corresponding to those of the painting equipment 16 in the first embodiment are designated by the same reference characters and the description thereof will be omitted. The painting equipment 216 in the second embodiment is identical with the painting equipment 16 in the first embodiment, except that the former has two loading positions 18a and 18b respectively for two carrying machines 21a and 21b, and two painting positions 19a and 19b respectively for the two painting machines 21a and 21b.

The painting positions 19a and 19b for the carrying machines 21a and 21b respectively are in a predetermined painting zone 219. Similarly, the loading positions 18a and 18b for the carrying machines 21a and 21b respectively are in a predetermined loading zone 218. The second embodiment, similarly to the first embodiment, can carry a workpiece W along a carrying route closer the pedestal 22 with respect to an imaginary circle having its center on the pedestal 22 and a radius corresponding to the distance between the pedestal 22 and either of the loading zone 218 and the painting zone 219. Thus the painting equipment 216 can be installed in a comparatively small space.

The carrying machines 21a and 21b respectively having linkages can carry workpieces W round the pedestal 22. Thus the loading positions 18a and 18b respectively for the carrying machines 21a and 21b can be at the shortest possible distance from each other, and the painting positions 19a and 19b respectively for the carrying machines 21a and 21b can be at the shortest possible distance from each other. Therefore, working efficiency can be improved. In a state where the holding unit 40 is at the loading position 18a (18b) and a state where the holding unit 40 is at the painting position 19a (19b), the first link 34 and the second link 35 extend in a straight line. Therefore, a workpiece W can be carried even if the loading zone 218 and the painting zone 219 are spaced a long distance apart. Thus the loading positions 18a and 18b respectively for the two carrying machines 21a and 21b can be close to each other, and the painting positions 19a and 19b respectively for the two carrying machines 21a and 21b can be close to each other.

Figure 10:
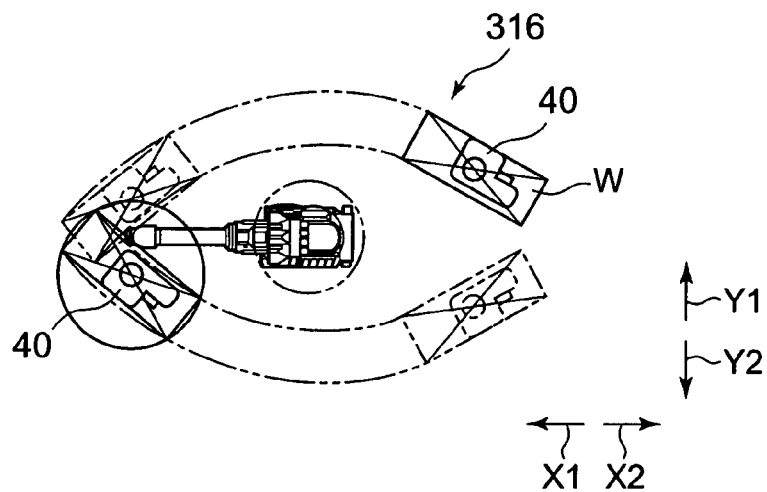
FIG. 10 is a fragmentary plan view of a painting equipment in a third embodiment according to the present invention.

FIG. 10 is a fragmentary plan view of a painting equipment 316 in a third embodiment according to the present invention. The painting equipment 316 may be provided with other motors for turning holding units 40 included in carrying machines 21a and 21b about their own axes in addition to motors for moving the holding units 40 along carrying routes. The holding unit 40 may be turned to hold the workpiece W in a predetermined position while a workpiece W is being carried along the carrying route. For example, when the carrying machine 21a (21b) carries a long workpiece W, the long workpiece W may be held so as to extend parallel to a tangent to a carrying route as shown in FIG. 10. Such a position of the workpiece W enables the carrying machine 21a (21b) to carry the workpiece W through the vicinity of the pedestal and contributes to the reduction of a space necessary for installing the painting equipment 316.

Figure 11:
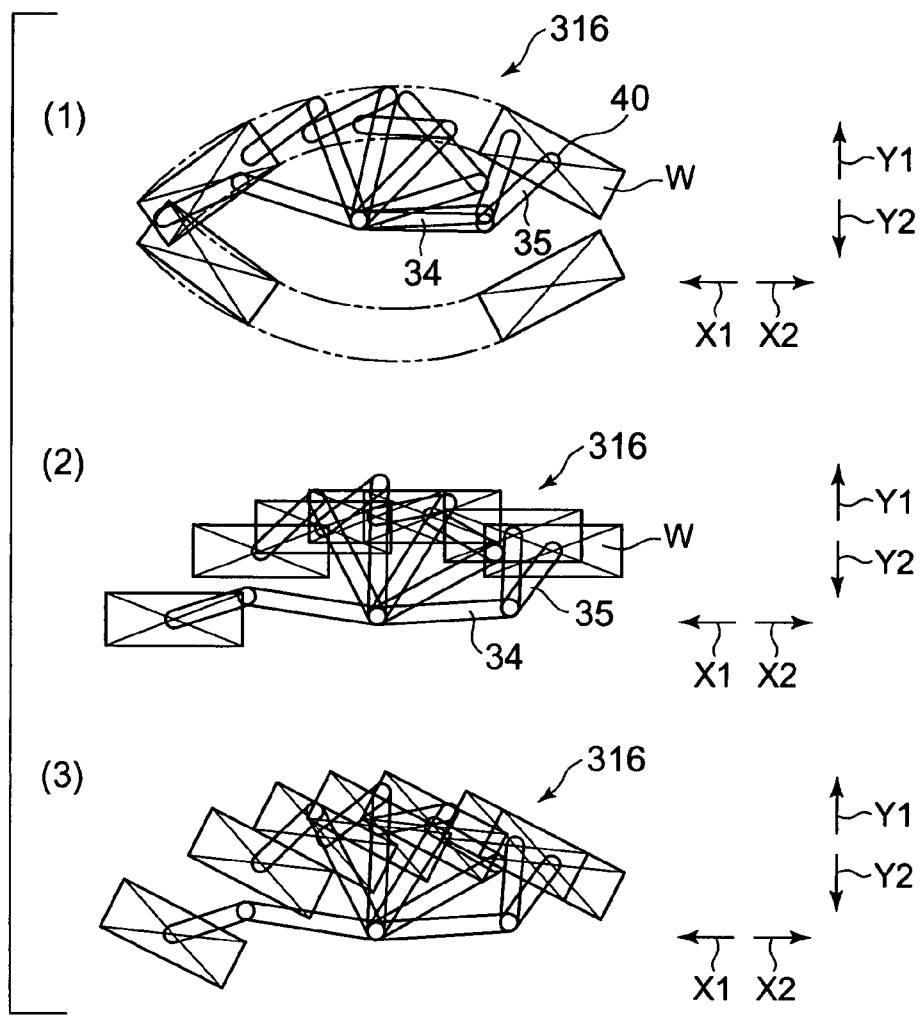
FIG. 11 includes diagrammatic views (1) to (3) showing, by way of example, positions of a workpiece during being carried.
Figure 12:
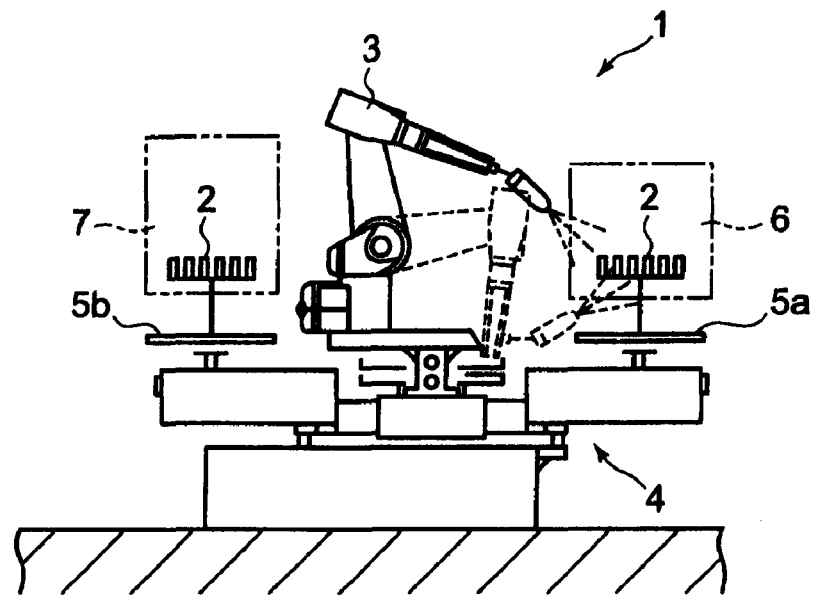
FIG. 12 is a side elevation of a first known painting equipment.
Figure 13:
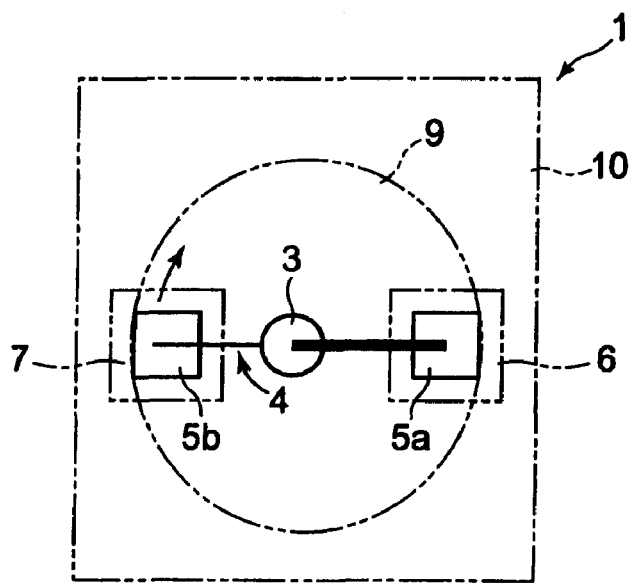
FIG. 13 is a schematic plan view of the first known painting equipment.
Figure 14:
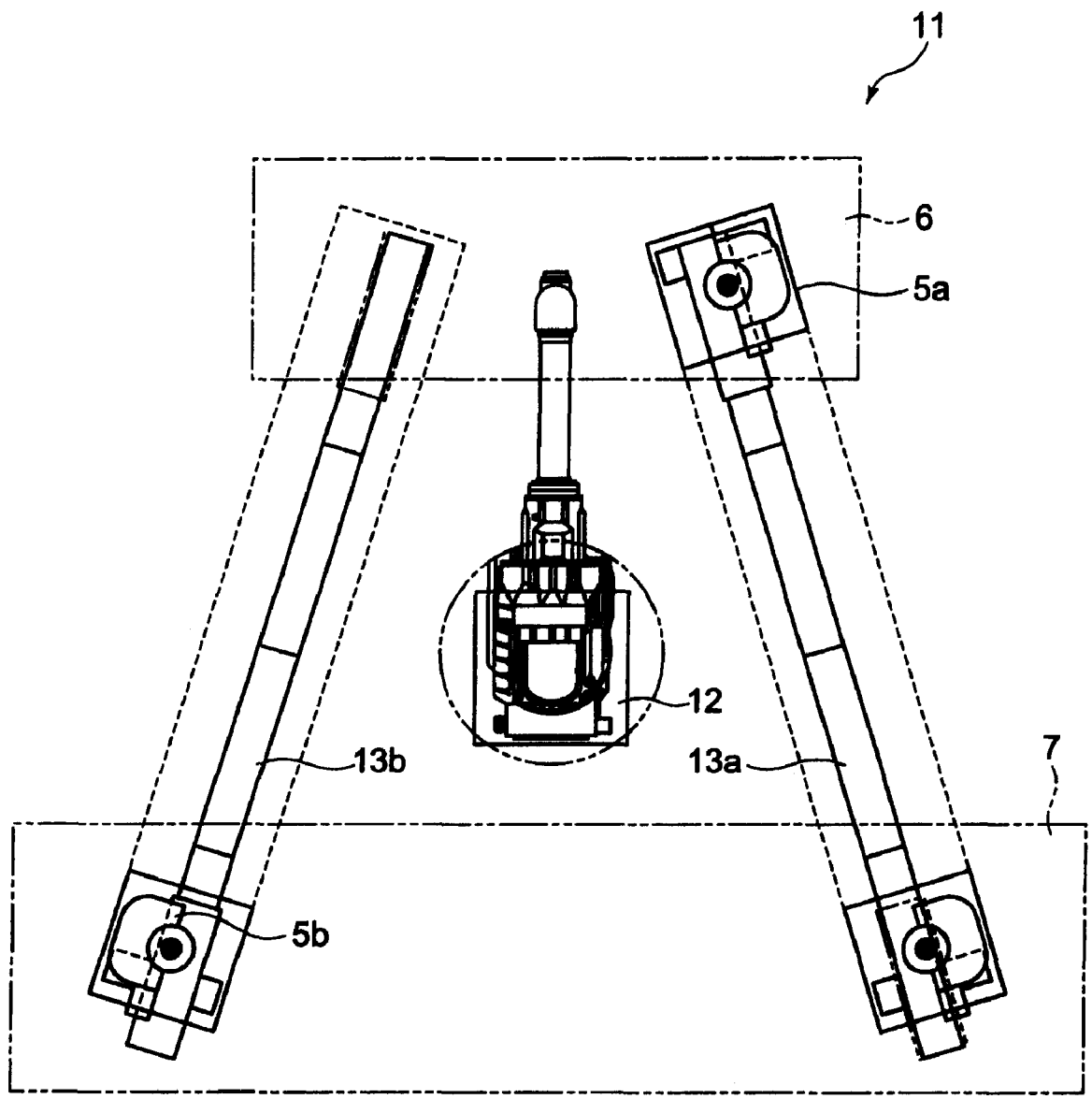
FIG. 14 is a plan view of a second known painting equipment.

FIG. 11 shows positions of a workpiece W during being carried by way of example. The workpiece W may be held during being carried so as to extend substantially parallel to a tangent to the carrying route as shown in FIG. 11(1). The workpiece W may be held during being carried so as to extend parallel to the longitudinal direction X as shown in FIG. 11(2). The workpiece W may be held during being carried so as to extend in a desired position as shown in FIG. 11(3). The painting equipment 316 in the third embodiment is provided with a motor for turning the holding unit 40 about its own axis. Or, workpiece W can be carried in a desired position by properly designing the interlocking mechanism coordinating the turning of the holding unit 40 about its own axis and the movement of the holding unit 40 along the carrying route without a motor for turning the holding unit 40.

The foregoing embodiments are only examples of the present invention and changes may be made therein without departing from the scope of the invention. An optional first direction, a second direction perpendicular to the first direction, and a vertical third direction perpendicular to both the first and the second direction may be used instead of the longitudinal direction X, the transverse direction Y and the vertical direction Z, respectively, although directions relating with the positions and operations of the carrying machines 21a and 21b and the painting machine 20 are termed by the longitudinal direction X, the transverse direction Y and the vertical direction Z. A plurality of painting equipments similar to the painting equipment 16 may be arranged closely and may be operated by one or a small number of operators. Although the painting equipment 16 in the foregoing embodiment includes the main controller 49 for controlling all the operations of the painting equipment 16, the painting equipment 16 may include a plurality of controllers. Although the painting equipments have been described by way of example, the present invention is applicable to processing equipments other than painting equipments. In a processing equipment, the painting position 19 is a processing position.

The holding unit 40 is moved along the substantially arc carrying route by the carrying machine provided with the linkage in the foregoing embodiment. A carrying machine other than those of the foregoing embodiments may be used. The carrying machine may be an articulated robot capable of moving the holding unit 40 in the longitudinal direction X and the transverse direction Y. In this case, the articulated robot moves the holding unit 40 also along a carrying route closer to the pedestal 22 with respect to an imaginary circle having its center on the pedestal 22 and a radius corresponding to the distance between the pedestal 22 and either of the loading position 18 and the painting position 19. The effect of the articulated robot is similar to that of the carrying system 16.

A carrying machine having an arc slide rail may be used for carrying a workpiece W. Although the carrying machine in the foregoing embodiment uses the single motor for both turning and moving the holding unit 40, the carrying machine may be provided with motors respectively for turning the holding unit 40 and for moving the holding unit 40.

What is claimed is:

1. A carrying system for carrying a workpiece between a processing zone where the workpiece is processed by a processing machine and a loading zone substantially opposite the processing zone with respect to a pedestal on which the processing machine is installed, comprising:
    a first carrying machine configured to carry the workpiece along a substantially arc shaped first carrying route extending between the processing zone and the loading zone, the first carrying route having a middle part protruding away from the pedestal; and
    a second carrying machine configured to carry the workpiece along a substantially arc shaped second carrying route extending between the processing zone and the loading zone, the second carrying route having a middle part protruding away from the pedestal, the second carrying route being positioned opposite the first carrying route with respect to the pedestal;
    wherein each of the first carrying machine and the second carrying machine includes comprises a base, a first link, a second link, a first joint joining the first link to the base so as to be turnable relative to the base, a second joint joining the first link and the second link together so as to be turnable relative to each other, and a holding unit mounted on the second link, the holding unit being configured to support the workpiece and to be moved along the first carrying route and/or the second carrying route, the first link having a length longer than a length of the second link,
    wherein each of the first carrying machine and the second carrying machine further comprises an interlocking mechanism configured to turn the second link relative to the first link in coordination with a turning of the first link relative to the base so that the holding unit is moved along the first carrying route and/or the second carrying route when the first link is turned relative to the base,
    wherein the base of the first carrying machine is fixed to a side wall of the pedestal facing a transverse direction Y1 and the base of the second carrying machine is fixed to a side wall of the pedestal facing a transverse direction Y2,
    wherein the first link and the second link are configured to overlap each other when the holding unit is near the pedestal,
    wherein each of the first carrying machine and the second carrying machine further comprises a transmission mode selecting mechanism configured to select:
        a holding unit moving mode that prevents a holding unit from turning and transmits a driving force to move the holding unit along the first carrying route and/or the second carrying route; or
        a holding unit turning mode that prevents a first link from turning and transmits a driving force to turn the holding unit about an axis of the holding unit.

2. The carrying system according to claim 1, wherein the carrying machines are configured to independently carry workpieces.

3. The carrying system according to claim 1, wherein the holding unit of each of the first carrying machine and the second carrying machine is configured to be moved to a processing position common to the first carrying machine and the second carrying machine in the processing zone.

4. The carrying system according to claim 1, wherein the holding unit of each of the first carrying machine and the second carrying machine is configured to be moved to a loading position common to the first carrying machine and the second carrying machine in the loading zone.

5. The carrying system according to claim 1, wherein the holding unit of each of the first carrying machine and the second carrying machine is configured to rotate in the processing zone, and
    wherein each of the first carrying machine and the second carrying machine further includes a transmission mode selecting mechanism configured to select a holding unit moving mode in which a driving force is transmitted so as to move the holding unit along the first carrying route and/or the second carrying route or a holding unit turning mode in which a driving force is transmitted so as to turn the holding unit about an axis of the holding unit.

6. A processing equipment comprising:
    the carrying system according to claim 1; and
    a processing machine configured to spray paint on the workpiece carried to the processing zone by the carrying system.

7. The carrying system according to claim 1, wherein the holding unit of each of the first carrying machine and the second carrying machine is configured to rotate in the processing zone, and
    the transmission mode selecting mechanism includes a stopping device that stops the holding unit.

8. The carrying system according to claim 2, wherein the holding unit of each of the first carrying machine and the second carrying machine is configured to rotate in the processing zone, and
    the transmission mode selecting mechanism includes a stopping device that stops the holding unit.

9. The carrying system according to claim 8, wherein the holding unit of each of the first carrying machine and the second carrying machine is configured to be moved to a processing position common to the first carrying machine and the second carrying machine in the processing zone.

10. The carrying system according to claim 9, wherein the holding unit of each of the first carrying machine and the second carrying machine is configured to be moved to a loading position common to the first carrying machine and the second carrying machine in the loading zone.

11. A processing equipment comprising:
the carrying system according to claim 10; and
a processing machine configured to spray paint on the workpiece carried to the processing zone by the carrying system.

* * * * *